Dec. 13, 1966   I. V. LARSSON   3,291,265
LOAD RESPONSIVE VEHICLE BRAKE SYSTEM
Filed July 9, 1964   2 Sheets-Sheet 1

INVENTOR.
Ingmar V. Larsson
BY Watson, Cole, Grindle & Watson
ATTORNEYS

United States Patent Office 3,291,265
Patented Dec. 13, 1966

3,291,265
LOAD RESPONSIVE VEHICLE BRAKE SYSTEM
Ingmar Valentin Larsson, Malmo, Sweden, assignor to Svenska Aktiebolaget Bromsregulator, Malmo, Sweden
Filed July 9, 1964, Ser. No. 381,496
Claims priority, application Great Britain, July 13, 1963, 27,860/63
5 Claims. (Cl. 188—195)

This invention relates to a vehicle brake system of the kind that is set for a lower or a higher braking effect by a fluid servo-motor through a valve operated in response to the vehicle load, the valve element of said valve being movable between two end positions and urged towards one of the end positions by a spring and being moved into the other end position by a push rod which extends through the housing of said valve and is mounted to be influenced by the relative movements occurring between two parts of the vehicle as a result of change in vehicle load.

It is an object of the invention to provide an improved brake system of the kind referred to in which the valve and the push rod are easy to mount even where the space available is small, for example on a bogie of a railway wagon.

Another object is to provide a device in which one and the same type of push rod can be used together with different types of fluid servomotors regardless of whether they are of vacuum or compressed air types.

A further object is to construct a device of the kind referred to in such a manner as to avoid oscillations of the said valve in case the load is near the limit for changing the brake effect.

Figure 1:
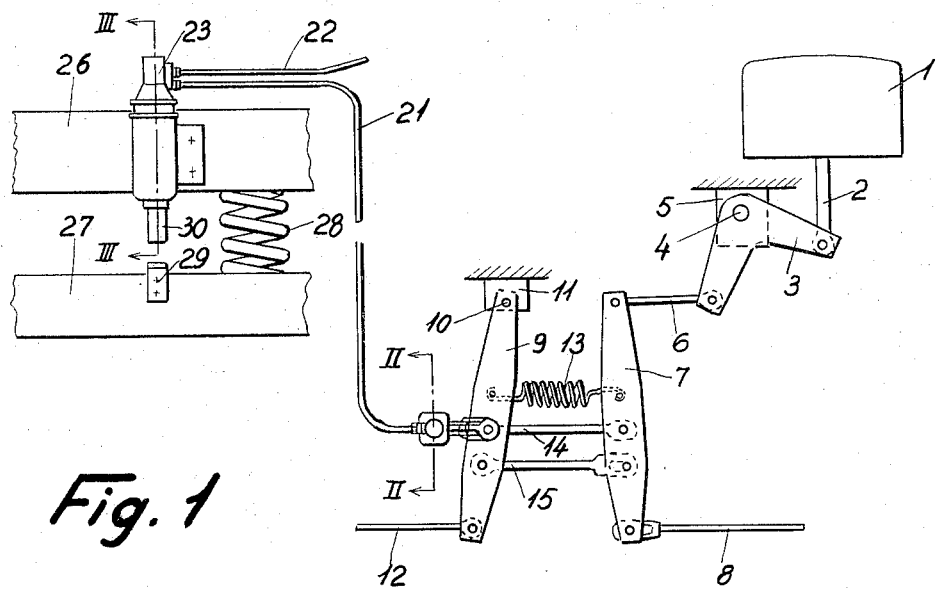
Figure 2:
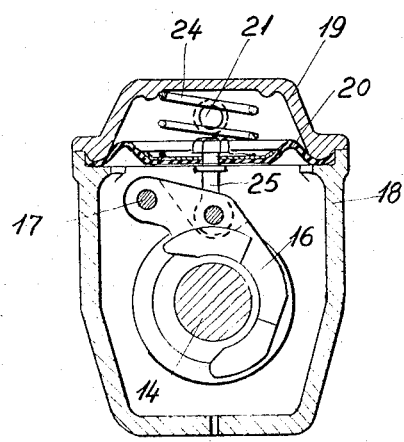
Figure 3:
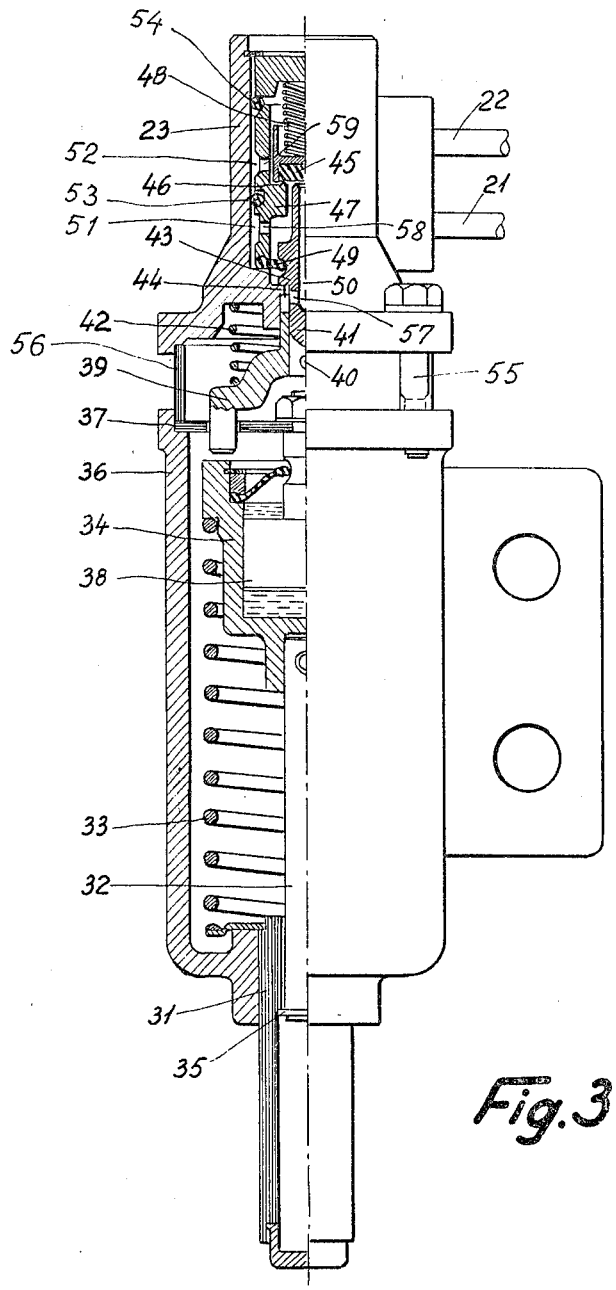

Still further objects and advantages of the invention will be apparent to those skilled in the art from the following detailed description of an embodiment, reference being made to the accompanying drawings in which FIG. 1 shows schematically a brake system according to the invention for a railway wagon, FIG. 2 is a view in section along the line II—II in FIG. 1 on a larger scale, and FIG. 3 is a view in section along the line III—III in FIG. 1 on a larger scale.

Referring to FIG. 1, the system comprises a vacuum brake cylinder 1 with a piston rod 2 for moving a bell-crank lever 3 which is pivotally connected at 4 to a bracket 5 on the underframe of the railway wagon. The bell-crank lever 3 is also connected to a rod 6 pivotally connected to one end of a live brake lever 7 the other end of which is pivotally connected to a pull rod 8 for transmitting the brake force to some of the brake blocks at the wagon wheels (not shown). A dead brake lever 9 is at one end pivotally connected at 10 to a bracket 11 mounted upon the underframe of the wagon. At the other end of the dead brake lever 9 is pivotally connected a pull rod 12 adapted to transmit brake force to others of the brake blocks. The two levers 7 and 9 are interconnected by a tension spring 13 and by two tie rods 14 and 15 arranged to provide some lost motion in their connections. The lost motion in the connection made by the rod 14 may be substantially reduced by a catch 16—shown in FIG. 2—which may be moved into and out of a position between two flanges of an extension of the rod 14. When the catch 16 is between the said flanges the rod 14 is effective to produce a lower gear ratio in the brake force transmission suitable for lower wagon loads. If the catch 16 is removed from the position in which it reduces the lost motion in the connection of the rod 14, the rod 15 is effective to produce a higher gear ratio in the brake force transmission.

FIG. 2 illustrates the mounting of the catch 16 and a servo-motor for actuating it. The catch 16 is pivotally mounted at 17 in a housing 18 provided with a cover 19. Between the housing 18 and the cover 19 is a flexible diaphragm 20. The space above the diaphragm 20 is connected to a source of vacuum by pipes 21 and 22 (shown in FIGS. 1 and 3), the connection being governed by a valve in a housing 23. A compression spring 24 acts upon the diaphragm 20 and tends—by means of a link 25—to move the catch 16 into its position between the flanges on the rod 14 for reducing the lost motion in the connection between the two brake levers 7 and 9.

In FIG. 1 are shown a part of a bolster 26 and a part of an adjacent bogie frame 27. A spring 28 supporting the bolster 26 is compressed when the wagon load is increased. The valve housing 23 is supported on the bolster 26 and an abutment 29 adapted to coact with a push rod 30 for actuating the valve is mounted on the bogie frame 27.

The operation of the parts so far described is as follows:

In the position shown in FIGS. 1 and 2 the compression spring 24 urges the catch 16 into the position in which it reduces the lost motion in the connection between the brake levers 7 and 9 provided by the rod 14. Thus the said rod 14 is effective to determine the gear ratio in the brake force transmission. In case the load on the wagon is increased, the distance between the bolster 26 and the bogie frame 27 is reduced and the abutment 29 engages the push rod 30, which causes opening of the valve in the connection between the pipes 21 and 22. The vacuum pipe 22 is thus connected to the space above the diaphragm 20, and the latter rises and causes the catch 16 to be removed from engagement with the rod 14. The lost motion of the said rod 14 is thus increased to such extent that the tie rod 15 becomes effective and determines a gear ratio higher than that previously determined by the rod 14.

In FIG. 3 the housing 23 and the pipes 21 and 22 are shown again. The pipes 21 and 22 communicate with spaces 51 and 52 respectively formed between an insert member 47 in the valve housing and the inner wall of the latter. The spaces 51 and 52 are sealed from one another by means of a sealing ring 53 and from the surroundings by means of a diaphragm 49 and a sealing ring 54 respectively. The push rod 30 consists of a lower tubular part 31 and an upper part 32 which are axially slidable in relation to each other and to a housing 36. A compression spring 33 bears against a flange mounted on the lower part 31 and against a cup-shaped member 34 rigidly connected to the upper part 32 of the push rod. The relative movement of the parts 31 and 32 from each other is limited by a locking ring 35. The part 31 is mounted with a sliding fit in the outer housing 36, and the latter is rigidly connected to the valve housing 23 by means of bolts 55, annular member 56 being inserted between the two housings. A partition wall 37 is clamped between the housing 36 and the annular member 56 and carries a piston 38 which is slidable in a cylindrical bore in the cup-shaped member 34, the said bore being partly filled with damping liquid, for example oil, suitable leakage being provided between the two sides of the piston 38, e.g., through the clearance between the latter and the wall of the bore of the member 34, or through a passage through the piston 38.

The valve contained in the housing 23 comprises a spider 39 rigidly connected to a spindle 41 by means of a pin 40. A compression spring 42 tends to force the spider 39 downwards, but the movement of the spider 39 and the spindle 41 is limited by coacting abutments 43 and 44 upon the spindle 41 and the housing 23 respectively. The spindle 41 is adapted to engage a valve element 45 which in the position shown engages a valve seat 46 which is a part of the insert member 47 which is rigidly mounted in the housing 23. The valve element 45 is loated by a compression spring 48. A diaphragm 49 may seal a space just below the valve element 45 from the atmosphere, but as long as there is no contact between the spindle 41 and the valve element 45 the said space will be vented through a bore 50 which communicates with the atmosphere through a transverse bore 57 and clearances between the various parts of the apparatus.

The device shown in FIG. 3 will function in the following manner. In the position shown vacuum exists in the pipe 22, whereas the pipe 21 is open to atmosphere through the bore 50. The contact between the valve element 45 and the valve seat 46 interrupts the connection between the two pipes 21 and 22. If the lower part 31 of the push rod is lifted slowly, the sub-assembly comprising the parts 31, 32, and 34 rises as a unit until the cup-shaped member 34 contacts the spider 39. The spider 39 then rises and the spindle 41 contacts the valve element 45. Now the connection between the pipe 21 and the atmosphere is interrupted. After a further short rising movement, the spindle 41 lifts the valve body 45 and compresses the spring 48. Now the pipe 21 is connected to the vacuum pipe 22 through the spaces 51 and 52 and transverse bores 58 and 59 of the insert member 47.

If the lower part 31 of the push rod 30 now descends the valve body 45 also descends and interrupts the connection between the pipes 21 and 22, and shortly afterwards the pipe 21 is opened to atmosphere. It will be understood that a certain hysteresis or slack exists in the function of the valve owing to the fact that two valve operations should be carried out before a change is made regarding the pressure in the pipe 21. This will reduce the tendency towards oscillation of the valve in case the load is near the limit for changing the brake effect.

However, such oscillation might still occur if, during running of the wagon, the bolster 26 is caused to oscillate at an amplitude exceeding the slack of the valve, but this is prevented by the hydraulic damping of the actuating means.

In the present construction the sub-assembly of parts 31, 32 and 34 is axially movable before contacting the spider 39. The movements of the push-rod 30 are damped by the hydraulic damper 34, 38. Thus it is ensured that the movements of the cup-shaped member 34 actually have been damped before it contacts the spider 39 even if some air bubbles are present in the damping liquid, and secondly the device is easy to mount regardless of any variations in the axial length of the outer housing 36.

The degree of damping of the movements of the cup-shaped member 34 may be varied as required. It may be such that a complete opening and closing cycle will last for 30 seconds for example. In such a case, variations of the position of the lower part 31 of the push rod 30 owing to oscillations of the bolster 26 during the running the wagon will not cause any flapping of the valve.

I claim:
1. A vehicle brake system comprising a fluid servo-motor for changing the braking ratio between a higher and a lower value and a valve for controlling said fluid servo-motor, said valve comprising a housing consisting of two interconnected parts, a valve member mounted in one of said housing parts, said valve member having two end positions, spring means urging said valve member towards one of its end positions, a push rod mounted in the other one of said housing parts and guided for sliding movement into and out of operative connection with said valve member, said push rod having a neutral position defined by an abutment and being movable forward from said neutral position under the influence of relative movements occurring between two parts of the vehicle as a result of change in vehicle load to urge said valve member towards its other end position, and hydraulic movement damping means interposed between said push rod and an element fast with said valve housing.

2. A vehicle brake system as in claim 1 in which said push rod consists of two axially aligned parts which are axially movable in relation to each other between two end positions, a spring urging said two parts towards the position of their maximum total length.

3. In a vehicle brake system, the combination, with a fluid servo-motor for changing the braking ratio between a higher and a lower value, of a control valve for said servo-motor, said valve comprising a valve housing having an inlet communicating with a source of fluid and an outlet communicating with said servo-motor, a valve member in said valve housing, said valve member having a neutral position in which it permits venting of said outlet and being actuatable first to close said venting path and then to establish communication between said inlet and said outlet, and vice versa on restoration to neutral, lost motion means for actuating said valve member in response to relative movement occurring between two parts of the vehicle as a result of change of vehicle load, said actuating means comprising a primary member movable relative to said valve housing in accordance with said relative movement of two parts of the vehicle, a secondary member movable relative to said valve housing and to said primary member, spring means urging said secondary member in the actuating direction relative to said primary member, stop means for limiting movement of said secondary member relative to said primary member under the influence of said spring means, so as to keep said secondary member at a distance behind its actuating position in the non-load state of the vehicle, and hydraulic damping means interposed between said secondary member and an element fast with said valve housing.

4. A control valve for a fluid servo-motor for changing the braking ratio of a brake system of a vehicle having two parts which are moved relative to one another under the influence of changes in vehicle load, comprising a valve housing attached to one of said vehicle parts, and consisting of two interconnected housing parts, a valve seat in one of said housing parts, a valve member engageable with said valve seat under the influence of biasing spring means, an inlet and an outlet communicating with spaces in said one housing part on opposite sides of the zone of engagement between said valve member and said valve seat, a valve lifting element engageable with said valve member on the outlet side of the zone of engagement between said valve seat and said valve member to lift the latter from the seat, said valve lifting element being constructed with a venting passage in a position to be closed upon engagement of said valve lifting element with said valve member, a lost motion push rod assembly for actuating said valve lifting member, said push rod assembly being slidably mounted in the other one of said housing parts and comprising a rear push rod element engageable by the other one of said vehicle parts in response to relative movement of said two vehicle parts, a front push rod slidable with respect to said rear push rod element, spring means urging said front push rod element forward with respect to said rear push rod element, stop means for limiting such relative forward movement of said front push rod element, so as to keep same at a distance from said valve lifting element in the non-loaded state of the vehicle, and hydraulic damping means interposed between said front push rod element and a part fast with said valve housing.

5. In a vehicle brake system having a fluid servo-motor for changing the braking ratio between a higher and a lower value, a control valve for said fluid servo-motor comprising, in combination, a valve housing, a valve member in said valve housing and movable between inoperative and operative positions with a hysteresis effect, resiliently yieldable and corrective lost motion actuating means for said valve member, and hydraulic movement damping means interposed between said actuating means and a part fast with said valve housing, said actuating means being operable in response to relative movements occurring between two parts of the vehicle as a result of change in vehicle load.

References Cited by the Examiner

UNITED STATES PATENTS

| 2,110,703 | 3/1938 | Farmer | 188—195 |
| 2,379,285 | 6/1945 | Down et al. | 188—195 |
| 2,424,913 | 7/1947 | Browall | 188—195 |
| 2,939,552 | 6/1960 | Bjereus | 188—195 |

DUANE A. REGER, *Primary Examiner.*